US009091779B2

(12) United States Patent
Li et al.

(10) Patent No.: US 9,091,779 B2
(45) Date of Patent: Jul. 28, 2015

(54) ADVANCED DETECTOR SYSTEM AND METHOD USING FORWARD THREE-DIMENSIONAL INDUCED POLARIZATION METHOD FOR TBM CONSTRUCTION TUNNEL

(71) Applicant: SHANDONG UNIVERSITY, JiNan, ShangDong Province (CN)

(72) Inventors: Shucai Li, JiNan (CN); Bin Liu, JiNan (CN); Zhengyu Liu, JiNan (CN); Lichao Nie, JiNan (CN); Jie Song, JiNan (CN); Huaifeng Sun, JiNan (CN); Chunjin Lin, JiNan (CN); Chuanwu Wang, JiNan (CN); Xinji Xu, JiNan (CN); Lei Xu, JiNan (CN); Tingyu Hao, JiNan (CN); Hao Zhou, JiNan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 14/235,307

(22) PCT Filed: Jan. 17, 2013

(86) PCT No.: PCT/CN2013/000041
§ 371 (c)(1),
(2) Date: Jan. 27, 2014

(87) PCT Pub. No.: WO2014/106308
PCT Pub. Date: Jul. 10, 2014

(65) Prior Publication Data
US 2014/0333308 A1 Nov. 13, 2014

(30) Foreign Application Priority Data

Jan. 7, 2013 (CN) .......................... 2013 1 0051329
Jan. 7, 2013 (CN) ...................... 2013 2 0067322 U

(51) Int. Cl.
*G01V 3/00* (2006.01)
*G01V 3/18* (2006.01)
(Continued)

(52) U.S. Cl.
CPC . *G01V 3/18* (2013.01); *E21B 47/01* (2013.01); *E21D 1/00* (2013.01); *E21D 9/003* (2013.01); *E21D 9/1093* (2013.01)

(58) Field of Classification Search
CPC ................................ G01V 3/18; E21B 49/003
USPC .......................................... 324/303, 332–354
See application file for complete search history.

(56) References Cited

U.S. PATENT DOCUMENTS 4,625,173 A * 11/1986 Wisler et al. .................. 324/351
(Continued)

FOREIGN PATENT DOCUMENTS

CN 101261325 A 9/2008
(Continued)

OTHER PUBLICATIONS

Aug. 30, 2013 Office Action issued in Chinese Patent Application No. 201310005132.9 (with translation).
(Continued)

*Primary Examiner* — Huy Q Phan
*Assistant Examiner* — Dustin Dickinson
(74) *Attorney, Agent, or Firm* — Oliff PLC

(57) ABSTRACT

Disclosed is an advanced detector system and method using a forward three-dimensional induced polarization method for a TBM (Tunnel Boring Machine) construction tunnel. A narrow detection space of a full-face excavated tunnel is fully used, a controller controls doors of a source and measuring electrode compartment and a shielding electrode compartment to open and controls a corresponding hydraulic delivery device to automatically and quickly arrange a source electrode system, a measuring electrode system and a shielding electrode system. Under the action of a shielding current system, tomography detection supply current is directed ahead of the working face. Three-dimensional geologic information can be obtained, and the relationship between an induced polarization half-decay time difference and a water quantity can be used to quantitatively forecast the water quantity of a water-bearing body, and meanwhile, the half-decay time difference parameter has a high capacity of distinguishing free water from bound water.

11 Claims, 12 Drawing Sheets

(51) Int. Cl.
*E21B 47/01* (2012.01)
*E21D 1/00* (2006.01)
*E21D 9/00* (2006.01)
*E21D 9/10* (2006.01)

(56) References Cited

U.S. PATENT DOCUMENTS

2008/0185903 A1\* 8/2008 Bausov et al. .......... 299/1.2
2010/0148566 A1 6/2010 Home et al.
2010/0226207 A1\* 9/2010 Armstrong .............. 367/57

FOREIGN PATENT DOCUMENTS

| CN | 102419454 A | 4/2012 |
| CN | 102508303 A | 6/2012 |
| CN | 102645669 A | 8/2012 |
| CN | 102681008 A | 9/2012 |
| CN | 203037864 U | 7/2013 |

OTHER PUBLICATIONS

Oct. 10, 2013 Written Opinion issued in International Patent Application No. PCT/CN2013/000041 (with translation).
Oct. 10, 2013 Search Report issued in International Patent Application No. PCT/CN2013/000041 (with translation).

\* cited by examiner

ADVANCED DETECTOR SYSTEM AND METHOD USING FORWARD THREE-DIMENSIONAL INDUCED POLARIZATION METHOD FOR TBM CONSTRUCTION TUNNEL

FIELD OF THE INVENTION

The present invention relates to the field of performing advanced forecast using a forward three-dimensional induced polarization method in a TBM construction tunnel, in particular to an advanced detector system and method using a forward three-dimensional induced polarization method for a TBM construction tunnel.

BACKGROUND OF THE INVENTION

In recent years, the proportion of using a full-section tunnel boring machine (TBM for short) for mechanical construction in tunnel construction is higher and higher; and the full-section TBM is a novel and advanced tunnel construction machine excavating by virtue of a rotary tool, and breaking surrounding rock in a tunnel and tunneling meanwhile, so as to form a whole tunnel section. When the TBM is used for tunneling, a prominent problem that the TBM is poor in adaptability to the changes of geologic conditions exists, so that serious accidents of blockage, burying and even mechanical scrap of the TBM are usually caused in unfavorable geologic conditions of faults, crushed zones, lithologic interfaces, water-bearing structures and the like. In order to reduce the risk of encountering the accidents aforementioned in TBM construction, the most effective solution is to detect unfavorable geologic conditions ahead of a working face in advance by adopting an advanced geologic forecast technology, and formulate a reasonable disposal measure and a construction plan in advance according to the geologic conditions ahead of the working face.

However, a very mature and effective special advanced geologic forecast method for a TBM construction tunnel is inexistent at home and abroad presently. For advanced geologic forecast devices and technologies, TBM construction has essential differences relative to drilling-blasting method construction: (1) the TBM is huge and occupies most of space behind the working face of the tunnel, and a common induced shot point and a common reception system for advanced forecast using a seismic wave method can not be arranged at the side wall of the tunnel, so that common advanced forecast technologies using the seismic wave method, such as TSP, TGP, TRT and the like in drilling-blasting method tunnels can not be applied to the TBM construction tunnels; (2) lots of metal members and power supply cables existing in the TBM are great in interference on an electromagnetic field, so that general advanced geologic forecast technologies based on an electromagnetic principle, such as a geologic radar method, a transient electromagnetic method and an induced polarization method, are extremely unsatisfactory in detection effect, and then can not be applied to the TBM construction tunnels; and (3) during TBM construction, about two hours of machine overhaul time should be ensured every day; and when the machine is overhauled, the cutter head of the TBM retreats 2-5 m, the narrow space can be used for implementing advanced geologic forecast, and the space is narrow and short in available time.

For the existing advanced geologic forecast technology in the TBM construction tunnels, two methods are mainly provided: (1) horizontal drilling is performed by virtue of an advanced drilling machine equipped by the TBM; and the drilling machine is only capable of showing the surrounding geologic conditions of a drill hole, incapable of detecting geologic bodies which are not intersected with the drill hole and reflecting the geologic conditions in the whole range ahead of the working face of the TBM, extremely easy to miss unfavorable geology to cause false alarm, wrong alarm and disaster hidden dangers, as well as high in economic cost and time cost for drilling. (2) a BEAM (Bore-Tunneling Electrical Ahead Monitoring) system researched and developed in Germany is used, and BEAM is a one-dimensional focusing-type induced polarization method; and the BEAM method has the following defects: 1, test equipment is complex in installation, and test time is long, so that construction progress is seriously influenced; and 2, in the BEAM method, the water-bearing condition ahead of a tunneling face is deduced by virtue of the measurement result of every time and the curve of a tunnel mileage, the detection distance is short, and tomography detection is not used, so that the three-dimensional information of geologic bodies ahead of the working face of the TBM can not be obtained, and water quantities can not be forecasted as well. In addition, from the view point of the application conditions of the BEAM method in a few of tunnels in China, the forecast result is unsatisfactory, and the BEAM method is not popularized and needs to be improved and perfected.

Thus it can be seen that very effective and practical advanced geologic forecast technology and device are inexistent for a TBM construction tunnel presently due to the reasons of narrow detection space, great electromagnetic interference, short available time and the like.

SUMMARY OF THE INVENTION

The present invention aims at overcoming the shortages of the prior art, and provides an advanced detector system and method using a forward three-dimensional induced polarization method for a TBM construction tunnel, wherein the basic principle is that a shielding electrode system is arranged around a working face or on the bottom plate of a side wall, a tomography detection power supply and measurement system is arranged on the working face, and under the action of the shielding current system, a tomography detection power supply current is directed ahead of the working face, at the moment, the electromagnetic interference of the TBM behind on the detection is less and negligible; and by adopting the forward three-dimensional induced polarization detecting method, three-dimensional geologic information ahead of the working face can be obtained, and the relationship between induced polarization half-decay time difference and water quantities can be used to quantitatively forecast the water quantities of water-bearing bodies.

In order to realize the purpose aforementioned, the following technical scheme is adopted in the present invention:

An advanced detector system using a forward three-dimensional induced polarization method for a TBM construction tunnel, wherein a master control room is arranged in a TBM main body, and a controller, a forward three-dimensional induced polarization transmitter and a forward three-dimensional induced polarization receiver are arranged in the master control room; at least one power supply and measurement electrode compartment is arranged on the cutter head of the TBM main body, on which multilayer rock coupling integrated electrodes, a support device for the power supply and measurement electrode compartment, and compartment doors are installed, and the multilayer rock coupling integrated electrodes form corresponding side lines on a working face; a power supply electrode B and a reception electrode N are arranged on a bottom plate behind the working face of the TBM main body, the rock coupling integrated electrodes are connected with the controller, the forward three-dimensional induced polarization transmitter and the forward three-dimensional induced polarization receiver by conductive wires respectively, and the power supply electrode B and the reception electrode N are connected with the forward three-dimensional induced polarization transmitter and the forward three-dimensional induced polarization receiver respectively; shielding electrode compartments and delivery devices for the shielding electrode compartments are further arranged at the front end and the periphery of the TBM main body, and shielding electrodes P are installed in the shielding electrode compartments; and a video monitoring device is further arranged in the power supply and measurement electrode compartment, and connected with the master control room.

A left power supply and measurement electrode compartment and a right power supply and measurement electrode compartment which are symmetrically distributed along the center of the TBM main body are provided, the compartment door of each power supply and measurement electrode compartment is divided into an upper part and a lower part, one part is provided with a convex groove, and the other part is provided with a concave groove; and opening and closing of the compartment door is controlled by the controller.

The support device comprises three parallel measuring line guide rods, the measuring line guide rods are connected with each other by a vertical hydraulic lifting device, horizontal hydraulic expansion devices are further arranged at both ends of each measuring line guide rod, and the measuring line guide rod at the middle position is connected with horizontal hydraulic delivery devices; the rock coupling integrated electrodes are installed on each measuring line guide rod and the horizontal hydraulic expansion devices at both ends; and the distance between the adjacent measuring line guide rods is 1.5-2.0 m.

Each rock coupling integrated electrode comprises two parts, namely, a rock coupling power supply electrode A and a rock coupling reception electrode M which are integrated together, wherein the rock coupling power supply electrode A comprises a metal electrode, the metal electrode is arranged in a PVC housing, the top end of the metal electrode is a rock coupling material, and the bottom end of the metal electrode is connected with a conductive wire; and the rock coupling reception electrode M comprises a non-polarizing electrode, the non-polarizing electrode is arranged in another PVC housing, the top end of the non-polarizing electrode is an electrode cap, and the bottom end of the non-polarizing electrode is connected with a conductive wire.

The video monitoring device is composed of a front-facing camera and a multi-window display, the front-facing camera is installed in the power supply and measurement electrode compartment, provided with an illumination lamp, and used for transmitting pictures to the display, the display is installed in the master control room of the TBM, and the front-facing camera is controlled by the controller.

Each shielding electrode compartment and the delivery device for the same comprise a shielding electrode compartment, shielding electrodes P and a hydraulic delivery device, the shielding electrodes P are divided into a working face shielding electrode group and a shield shielding electrode group according to installation positions, the working face shielding electrode group is distributed on the circumference of the contour line of the cutter head of the TBM main body, a circle of the shield shielding electrode group is arranged at a position 2-3 m behind the front end of the TBM main body; each shielding electrode P comprises a metal electrode, the metal electrode is arranged in a PVC housing, the top end of the metal electrode is a rock coupling material, and the bottom end of the metal electrode is connected with a conductive wire, the shielding electrode is installed at the front end of the hydraulic delivery device, the hydraulic delivery device is installed in the shielding electrode compartment, the shielding electrode compartment is provided with a compartment door, and opening and closing of the compartment door is controlled by the controller.

The power supply electrode B and the reception electrode N on the bottom plate behind the working face of the TBM main body are 100-150 m away from the working face of the TBM. An advanced detection method utilizing the advanced detector system using the forward three-dimensional induced polarization method for a TBM construction tunnel, comprising the following steps: arranging a circle of shielding electrodes P on the contour line of the working face by utilizing the advanced detector system using the forward three-dimensional induced polarization method for a TBM construction tunnel, arranging a circle of shielding electrodes on the bottom plate of a side wall 2-3 m behind the tunneling working face, and arranging parallel measuring lines formed by a plurality of rock coupling integrated electrodes on the working face; and arranging a power supply electrode and a reception electrode on the bottom plate 100-150 m behind the working face;

supplying currents in the same direction to the power supply electrode and the shielding electrode, testing the potential difference between the multilayer rock coupling integrated electrodes and the reception electrode on the bottom plate and half-decay time respectively, and changing the currents to test the potential difference between the multilayer rock coupling integrated electrodes and the reception electrode on the bottom plate and half-decay time under the different currents; performing inversion by virtue of the tested potential difference data, so as to obtain the three-dimensional resistivity images of geologic bodies ahead of the working face and realize three-dimensional location of water-bearing bodies; drawing the relationship coordinate graph of the half-decay time difference data and a horizontal distance by the tested half-decay time, calculating the envelope area of the half-decay time difference and a horizontal coordinate axis, drawing the two-dimensional cross-sectional graph of the envelope area, and realizing estimation of water quantities ahead of the working face.

A positive current $I_0$ is supplied to each rock coupling power supply electrode A on the working face, a negative current $-I_0$ is supplied to the power supply electrode B on the bottom plate, a positive current in the same direction with the rock coupling power supply electrodes A on the working face is supplied to all the shielding electrodes P on the contour line of the working face and the surrounding rock behind the working face, and the potential difference U between the rock coupling reception electrode M on the working face and the reception electrode N on the bottom plate and the half-decay time t are acquired;

after the data are acquired by each measuring line according to the aforementioned power supply and measurement method, a positive current $2I_0$ is supplied to each single rock coupling power supply electrode A on the working face, a negative current $-I_0$ is supplied to the power supply electrode B on the bottom plate, and the step of data acquisition is repeated. After the data acquisition is finished, three-dimensional inversion imaging location is performed on water-bearing structures, inequality constraint inversion iteration based on a barrier function method and the like are used for processing, inversion is performed on the potential difference data U tested in the aforementioned step, so as to obtain the three-dimensional resistivity images of geologic bodies ahead of the working face and realize three-dimensional location of water-bearing bodies; estimation of water quantities ahead of the working face is performed by virtue of the half-decay time data t, the difference between the half-decay time data t tested in the aforementioned step and the two half-decay time data at the same point position during two times of power supply with a high current and a low current is evaluated, a relationship coordinate graph of the half-decay time difference data and the horizontal distance is drawn respectively, the envelope area St of the half-decay time difference and the horizontal coordinate axis is calculated, each water quantity is estimated by the area of a positive value part according to that the envelope area St and the water quantity V form a linear positive correlation relationship, and the positive value part is the response to the water quantity, and then estimation of the water quantity of a geologic disaster source is realized.

The present invention has the following beneficial effects: 1> The present invention performs a reformation design on the TBM, and provides an advanced detector using a forward three-dimensional induced polarization method and assembled on the TBM, which comprises the main components of a power supply and measurement electrode compartment and an automatic support device for the power supply and measurement electrode compartment, shielding electrode compartments and delivery devices for the shielding electrode compartments, a forward three-dimensional induced polarization transmitter, a forward three-dimensional induced polarization receiver, a video monitoring device and a controller, and all the main components are added and improved under comprehensive consideration for the existing interior space environment and the device system of the TBM, and good in compatibility with the TBM.

2> The present invention provides a power supply and measurement electrode compartment and an automatic support device for the power supply and measurement electrode compartment, and shielding electrode compartments and delivery devices for the shielding electrode compartments, arrangement work of a power supply electrode system, a measurement electrode system and a shielding electrode system can be automatically and rapidly finished under the control of the controller, thus breaking through the difficult problem of narrow detection space of advanced geologic forecast for full-section tunneling, greatly increasing the working efficiency of the advanced geologic forecast, and saving time cost and economic cost.

3> The present invention provides an advanced detection method using a forward three-dimensional induced polarization method for a TBM construction tunnel, which adopts a forward detection mode, has a better advanced detection directivity compared with the existing BEAM method, solves the previous difficult problem of serious side interference, and effectively increases the forecast distance; data are acquired layer by layer by adopting a tomography method, the three-dimensional information of the geologic bodies ahead of the tunneling working face of the TBM can be detected, the water contents can be forecast, and free water and bound water can be distinguished, thus solving the previous difficult problem on three-dimensional location of water-bearing bodies and forecast of water quantities.

Figure 1:
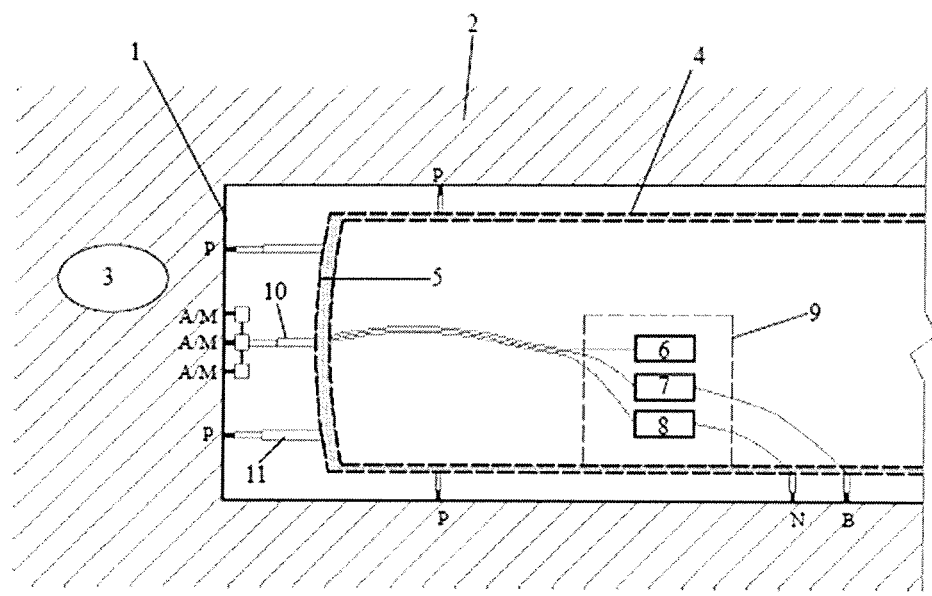
FIG. 1 is a structural schematic view of overall installation of the advanced detector in the present invention.

Wherein the tunneling working face 1 of the TBM, the surrounding rock 2, the unfavorable geologic bodies 3 ahead of the working face, the TBM main body 4, the cutter head 5, the controller 6, the forward three-dimensional induced polarization transmitter 7, the forward three-dimensional induced polarization receiver 8, the master control room 9, the support device 10, the hydraulic delivery devices 11, the working face shielding electrode group 12, the rock coupling integrated electrodes 13, a hob 14, the left compartment 15 of the power supply and measurement electrode compartment, the right compartment 16 of the power supply and measurement electrode compartment, the shielding electrode compartments 17, an upper convex groove structure 18 of each electrode compartment, a lower concave groove structure 19 of each electrode compartment, the measuring line guide rods 20, the horizontal hydraulic delivery devices 21, the vertical hydraulic lifting device 22, the horizontal hydraulic expansion devices 23, the front-facing camera 24, the shield shielding electrode group 25, the non-polarizing electrodes 26, the metal electrodes 27, the conductive wires 28, the electrode caps 29, the rock coupling material 30, and the PVC housings 31 are included.

In addition, the meanings of letters A, B, M, N and P in FIG. 1 are the rock coupling integrated electrodes, the power supply electrodes, the rock coupling reception electrodes, the reception electrodes, and the shielding electrodes respectively.

DETAILED DESCRIPTION OF THE EMBODIMENTS

The present invention is further illustrated below by virtue of specific embodiments and drawings.

All the work in the present invention is realized in the master control room 9 of the TBM. An arrangement process for the power supply and measurement electrode system of the tunneling working face of the TBM is introduced first.

Figure 2:
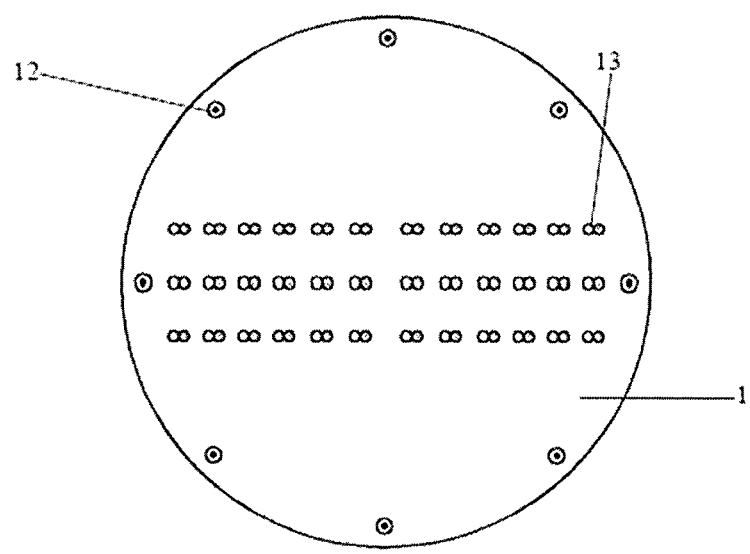
FIG. 2 is an arrangement schematic view of the electrode system of the tunneling working face of the TBM in the present invention.
Figure 3:
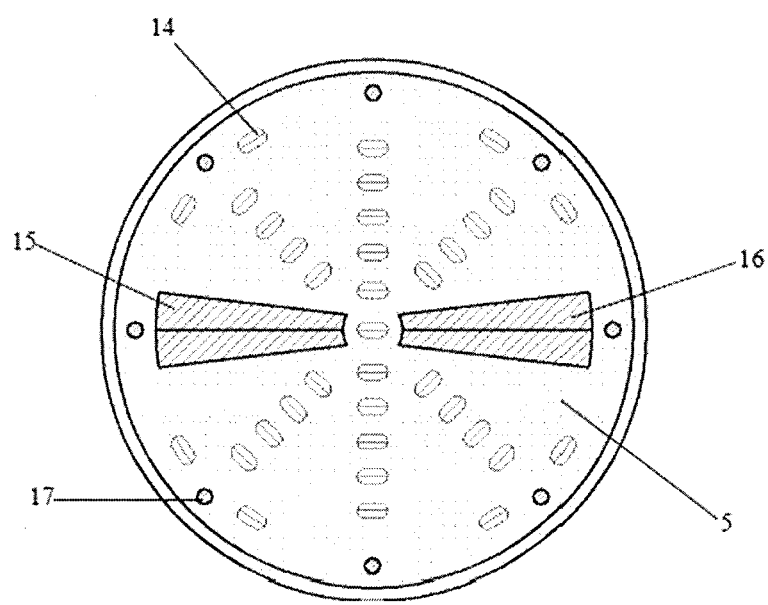
FIG. 3 is a structural schematic view of the cutter head of the TBM in the present invention.
Figure 4:
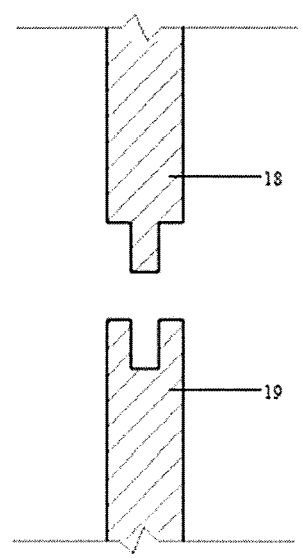
FIG. 4 is a structural cross-sectional view of the compartment door of each electrode compartment in the present invention.
Figure 5:
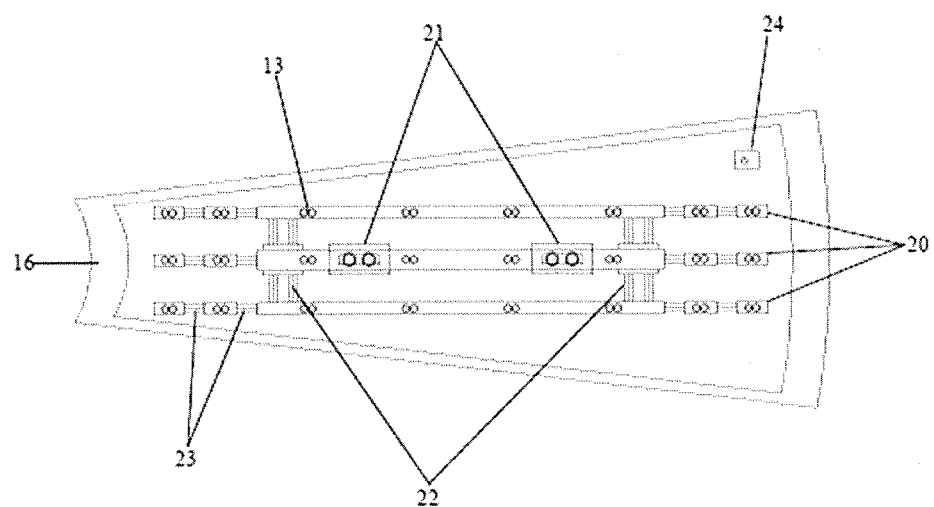
FIG. 5 is a schematic view of the internal structure of the right compartment of each power supply and measurement electrode compartment in the present invention.
Figure 6:
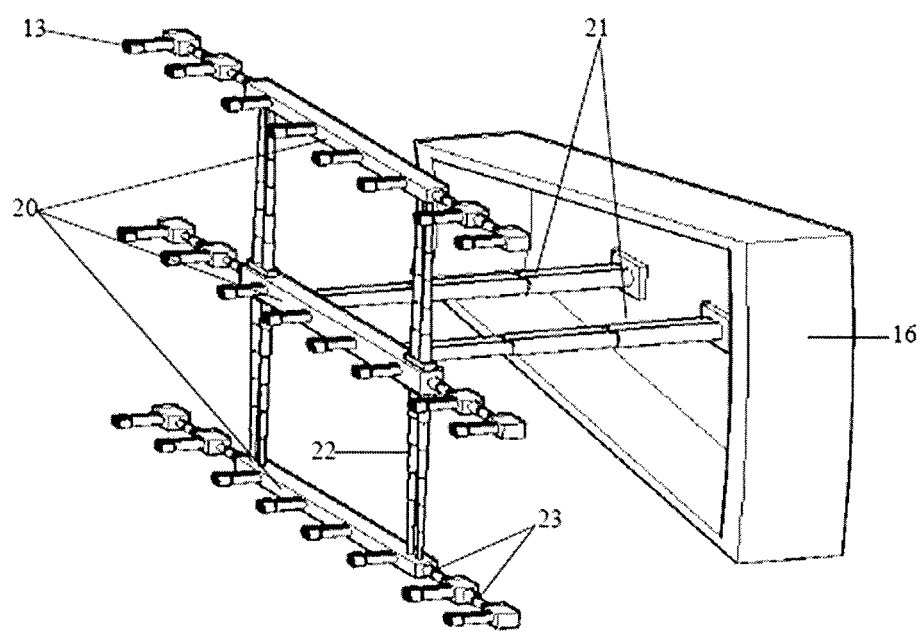
FIG. 6 is a schematic view of the open structure of the right compartment of each power supply and measurement electrode compartment in the present invention.

As shown in FIG. 1 and FIG. 2, when the TBM main body 4 tunnels forwards, the controller 6 controls the compartment doors of the left compartment 15 of the power supply and measurement electrode compartment and the right compartment 16 of the power supply and measurement electrode compartment on the cutter head 5 to be in a closed state, so as to protect three layers of the rock coupling integrated electrodes in the compartments and the support device 10 for the compartments from being worn. After the TBM main body 4 stops tunneling and before advanced geologic forecast work is started, the controller 6 controls the compartment doors of the left compartment 15 of the power supply and measurement electrode compartment and the right compartment 16 of the power supply and measurement electrode compartment to be opened simultaneously, and controls each horizontal hydraulic delivery device 21 to push the three parallel measuring line guide rods 20 embedded with the rock coupling integrated electrodes 13 towards the tunneling working face 1. Each compartment door is divided into an upper part and a lower part, the upper convex groove structure 18 of each electrode compartment is provided with a convex groove, the lower concave groove structure 19 of the electrode compartment is provided with a concave groove, and the upper convex groove structure 18 and the lower concave groove structure 19 are tightly fitted during closure, and good in air tightness.

Figure 9:
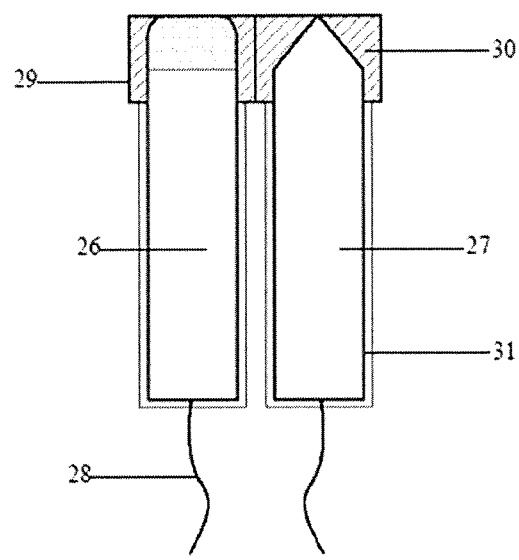
FIG. 9 is a cross-sectional view of each rock coupling integrated electrode in the present invention.

When the working face 1 is approached, the controller 6 suspends the horizontal hydraulic delivery devices 21, starts the vertical hydraulic lifting device 22, and pushes the upper and lower measuring line guide rods 20 by an equal distance of 1.5-2.0 m upwards and downwards respectively. After a predetermined distance is achieved, the controller 6 stops the vertical hydraulic lifting device 22, starts the horizontal hydraulic expansion devices 23, extends each measuring line guide rod 20 towards the both sides respectively, and ensures that the length of the measuring line guide rod 20 can achieve the section dimension of the whole driving working face as far as possible. The controller 6 stops the horizontal hydraulic expansion devices 23, starts the horizontal hydraulic delivery devices 21, continues to push the three parallel measuring line guide rods 20 to the tunneling working face 1 of the TBM, and enables all the rock coupling integrated electrodes 13 on each measuring line guide rod 20 to be completely and closely contacted with the working face 1. Each rock coupling integrated electrode 13 is a combination of the rock coupling power supply electrode A and the rock coupling reception electrode M, as shown in FIG. 9, the rock coupling power supply electrode A comprises the metal electrode 27, the metal electrode 27 is arranged in the PVC housing 31, the top end of the metal electrode 27 is the rock coupling material 30, and the bottom end of the metal electrode 27 is connected with the conductive wire 28; and the rock coupling reception electrode M comprises the non-polarizing electrode 26, the non-polarizing electrode 26 is arranged in another PVC housing 31, the top end of the non-polarizing electrode 26 is the electrode cap 29, and the bottom end of the non-polarizing electrode 26 is connected with the conductive wire 28.

When the rock coupling integrated electrodes 13 are closely contacted with the working face 1, the metal electrodes 27 and the non-polarizing electrodes 26 are greatly coupled with rock by the coupling materials 30 (generally conductive adhesive), the coupling materials 30 are stored in the electrode caps 29, and the PVC housings 31 are designed to be insulated from the three parallel measuring line guide rods 20, so as to ensure that the power supply current is only transmitted to the working face 1. The three parallel measuring line guide rods 20 in the left compartment 15 of each power supply and measurement electrode compartment and the right compartment 16 of each power supply and measurement electrode compartment are pushed to the working face 1 simultaneously, so as to finish complete arrangement of the three parallel measuring lines on the working face 1.

The front-facing camera 24 is installed in the left compartment 15 of the power supply and measurement electrode compartment and/or the right compartment 16 of the power supply and measurement electrode compartment, designed to be dustproof, waterproof and shockproof, and provided with a lamplight illumination function, thus being capable of clearly capturing the process of arranging the electrode system on the working face, and transmitting pictures to the multi-window display in the master control room 9. A rock coupling power supply electrode B and a rock coupling reception electrode N are arranged on the bottom plate at infinity of the working face 1 (for example, 100-150 m behind the working face).

The controller 6 is installed in the master control room 9, and mainly used for controlling opening and closing of the compartment door of the power supply and measurement electrode compartment, contraction and release of the automatic support device for the power supply and measurement electrode compartment, opening and closing of the compartment doors of the shielding electrode compartments, and contraction and release of the hydraulic delivery devices for the shielding electrode compartments, and controlling the rotation of the lens of the front-facing camera to capture the whole process of arranging the electrode system.

Next, the process of arranging the shielding electrode system is introduced.

Figure 7:
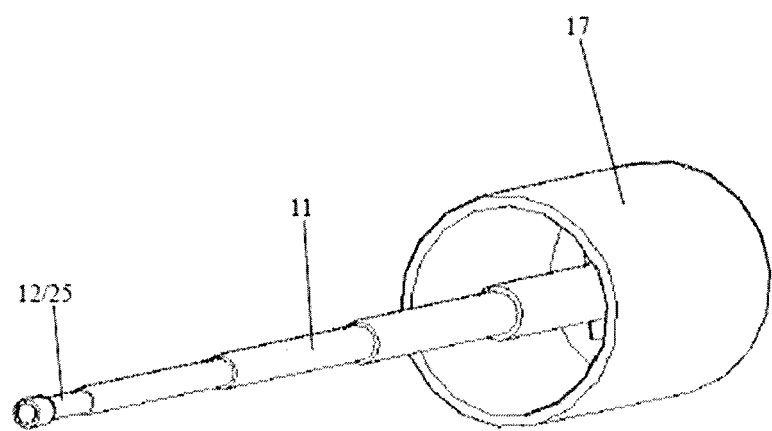
FIG. 7 is a schematic view of the open structure of the compartment door of each shielding electrode compartment in the present invention.
Figure 8:
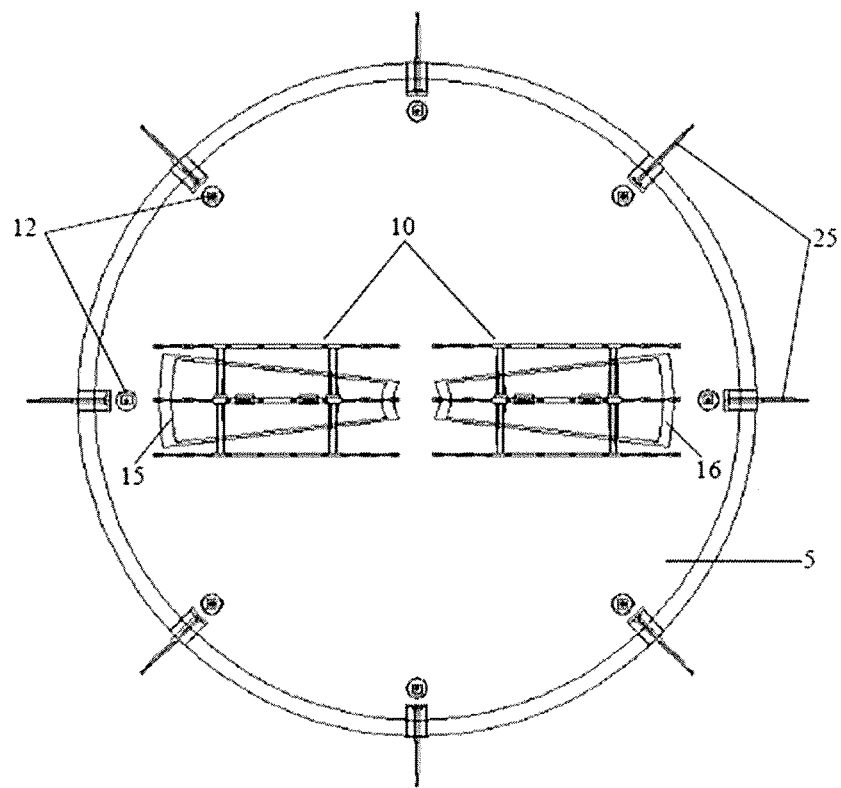
FIG. 8 is a schematic view of the working state of advanced geologic forecast of the power supply and measurement electrode compartment, the automatic support device for the power supply and measurement electrode compartment, the shielding electrode compartments and the delivery devices (comprising the working face shielding electrode group and the shield shielding electrode group) for the shielding electrode compartments in the present invention.

The shielding electrodes P are divided into two parts, namely, the working face shielding electrode group 12 and the shield shielding electrode group 25 which are the same in structure, as shown in FIG. 7, each of the electrode groups comprises a shielding electrode compartment 17, the hydraulic delivery device 11 is arranged in the shielding electrode compartment 17, and the front end of the hydraulic delivery device 11 is the shielding electrode P. The shielding electrode P and the rock coupling power supply electrode A are the same in structure, the shielding electrode P comprises the metal electrode 27, the metal electrode 27 is arranged in the PVC housing 31, the top end of the metal electrode 27 is the rock coupling material 30, and the bottom end of the metal electrode 27 is connected with the conductive wire 28.

The installation position of the working face shielding electrode group 12 is close to the contour line (on the cutter head 5) of the cutter head 5, and the installation position of the shield shielding electrode group 25 is surrounding a shield (on the shield and about 2.0-3.0 away from the working face 1). When the TBM main body 4 tunnels forwards, the controller 6 controls the compartment doors of the shielding electrode compartments 17 to be in a closed state, so as to protect the shielding electrodes P and the hydraulic delivery devices 11 from being worn. After the TBM main body 4 stops tunneling and before advanced geologic forecast work is started, the controller 6 controls the compartment doors of all the shielding electrode compartments 17 to be opened, and controls the hydraulic delivery devices 11 to push the shielding electrodes P to the working face 1 or the surrounding rock 2 (2.0-3.0 m) behind the working face 1, until all the shielding electrodes P are closely contacted with the working face 1 or the surrounding rock 2 behind the working face 1. Each shielding electrode P is internally provided with only one metal electrode 27 and not provided with the non-polarizing electrode 26, and belongs to the rock coupling power supply electrodes.

After arrangement of the electrode system is finished, data acquisition work is started. All the power supply electrodes and all the shielding electrodes P are connected to the forward three-dimensional induced polarization transmitter 7 by the conductive wires, all the reception electrodes are connected to the forward three-dimensional induced polarization receiver 8 by the conductive wires. The forward three-dimensional induced polarization transmitter 7 is capable of transmitting multi-path power supply currents simultaneously, and the forward three-dimensional induced polarization receiver 8 is used for controlling the reception electrodes to measure potential difference U and half-decay time t. After the data acquisition is finished, interpretation processing is performed on the data, and the three-dimensional information of the geologic bodies ahead of the tunneling working face 1 of the TBM, and the water contents are forecast. The processing results can be displayed on the multi-window display in the master control room 6.

A realization process of the advanced detection method using the forward three-dimensional induced polarization method is introduced below.

(1) Data are acquired layer by layer by adopting a forward tomography method, a positive current $I_0$ is supplied to each rock coupling power supply electrode A on the working face 1, a negative current $-I_0$ is supplied to the power supply electrode B on the bottom plate, a positive current in the same direction with the rock coupling power supply electrodes A on the working face 1 is supplied to all the shielding electrodes P on the contour line of the working face 1 and the surrounding rock behind the working face 1, the potential difference U between the rock coupling reception electrodes M on the working face 1 and the reception electrode N on the bottom plate and half-decay time t are acquired. After the data are acquired by all the three measuring lines according to the aforementioned power supply and measurement method, a positive current $2I_0$ is supplied to each single rock coupling power supply electrode A on the working face 1, a negative current $-I_0$ is supplied to the power supply electrode B on the bottom plate, and the step of data acquisition is repeated.

(2) After the data acquisition is finished, three-dimensional inversion imaging location for water-bearing structures is performed, inequality constraint inversion iteration based on a barrier function method is used for processing, inversion is performed on the potential difference data U tested in the aforementioned step, so as to obtain the three-dimensional resistivity images of geologic bodies ahead of the working face, and realize three-dimensional location of water-bearing bodies; and the specific steps are as follows:

the following inversion target function is put forward by comprehensively considering a smoothness constraint and an inequality constraint:

$$\Phi = (d_{obs} - d_m)^T(d_{obs} - d_m) + \lambda(Cm)^T(Cm)$$

subject to $\rho min_i \leq m_i \leq \rho max_i$ \hfill (1)

wherein $d_{obs}$ is actual observation data, $d_m$ is theoretical observation data obtained by forward modelling, m is a model parameter vector, C is a smoothness matrix, $\lambda$ is a Lagrange constant and decides the weight of the smoothness constraint, $m_i$ is the resistivity of the $i^{th}$ mesh, and $\rho min_i$ and $\rho max_i$ are the lower limit and the upper limit of the resistivity of the $i^{th}$ mesh respectively; and is should be noted that the change range of the resistivity can be a wide range obtained according to common sense, or an accurate range obtained according to modes such as drilling and the like.

The problem of solving the minimum of formula (1) is a typical quadratic programming problem with the inequality constraint, and processing of the inequality constraint is the key to the solution of the problem. The information of the inequality constraint is embedded in the target function by the barrier function method, and an augmentation target function is constructed on the basis of formula (1), as shown in formula (2):

$$\Phi' = \Phi + \mu F \hfill (2)$$
$$= \Phi - 2\mu \left\{ \sum_{i=1}^{M} \ln\left(\frac{m_i}{\rho min_i} - 1\right) + \sum_{i=1}^{M} \ln\left(1 - \frac{m_i}{\rho max_i}\right) \right\}$$

wherein $\mu'$ is always greater than zero and is a barrier factor, $\phi'$ is the augmentation target function, $\Phi$ is the target function, F is an inequality constraint variable, and M is the number of the resistivity parameters of meshes.

The problem of optimizing the augmentation target function is solved by a Newton Method, so as to obtain the following formula:

$$(A^T A + \lambda C^T C + \mu_k X^{-2} + \mu_k Y^{-2})\Delta m = A^T \Delta d - \lambda C^T Cm + \mu_k (X^{-1} - Y^{-1})e \hfill (3)$$

wherein A is a partial derivative matrix, $\Delta m$ is a model parameter increment vector, $\Delta d$ is observation data, $\Delta d = d_{obs} - d_m$, $e = (1, 1, \ldots 1)^T$ and Y are diagonal matrixes, the diagonal elements of the matrix X are $m_i - \rho min_i$ (i=1, 2, M), and the diagonal elements of the matrix Y are $\rho max_i - m_i$ (i=1, 2, M), and $\mu_k$ is a sequence in which $\mu$ strictly decreases monotonically and tends to zero in the calculation process.

The linear system (3) of equations is an inversion imaging equation containing the inequality constraint, due to the application of the barrier function, an inversion search range is limited in a feasible region, and due to the addition of such important apriori information as the inequality constraint, inversion multiplicity of the solution is improved, thus having a positive action on improvement of the inversion effect.

Figure 10:
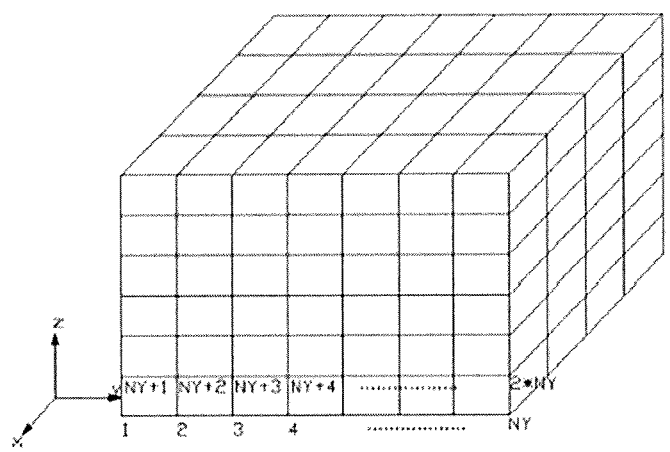
FIG. 10 is a schematic view of a three-dimensional finite element inversion mesh model in the present invention.

When inversion imaging is performed, a three-dimensional finite element inversion model (as shown in FIG. 10) is established, the initial value of the resistivity of meshes is set, and the change range of the resistivity of meshes is determined first; then, value forward modelling is performed by a finite element method, and the large linear system of equations during forward modelling is solved by a cholesky decomposition method, so as to obtain corresponding theoretical observation data $d_m$; an inversion convergence judgement is performed, if an error between the theoretical observation data and the actual observation data meets a convergence criterion (the convergence criterion is rus<$\epsilon_{im'}$ wherein rus is the mean square error between the observation data $d_{obs}$ and the forward modelling theoretical value $d_m$, and $\epsilon_{im'}$ is the admissible value of inversion convergence), the model parameters obtained at the moment are output as the inversion result; or else, the next calculation is performed; the partial derivative matrix, the smoothness matrix and the matrixes X and Y are calculated, the inversion equation (3) is solved to obtain a model increment Δm; a new generation of model parameters is obtained by calculation, μ is updated according to a decreasing sequence of numbers, the step (2) is executed, and the next cycle is performed, until the variance of the theoretical observation data of forward modelling and the measurement data is less than a set value (the set value is different according to the different inversion accuracies required by users, if the inversion accuracy is high, then the set value is low; or else, the set value is high), and the model parameters are output; thus, the three-dimensional resistivity images of the geologic bodies ahead of the working face are obtained by inversion, and three-dimensional location of the water-bearing bodies is realized.

(3) Estimation of water quantities ahead of the working face is performed by virtue of the half-decay time data t, difference between the half-decay time data t tested in the aforementioned step and the two half-decay time data at the same point position during two times of power supply with a high current and a low current is evaluated, a relationship coordinate graph of the half-decay time difference data and the horizontal distance is drawn respectively, the envelope area St of the half-decay time difference and the horizontal coordinate axis is calculated, each water quantity is estimated by the area of a positive value part according to that the envelope area St and the water quantity V form a linear positive correlation relationship, and the positive value part is the response to the water quantity, and then estimation of the water quantity of a geologic disaster source is realized.

Figure 11A:
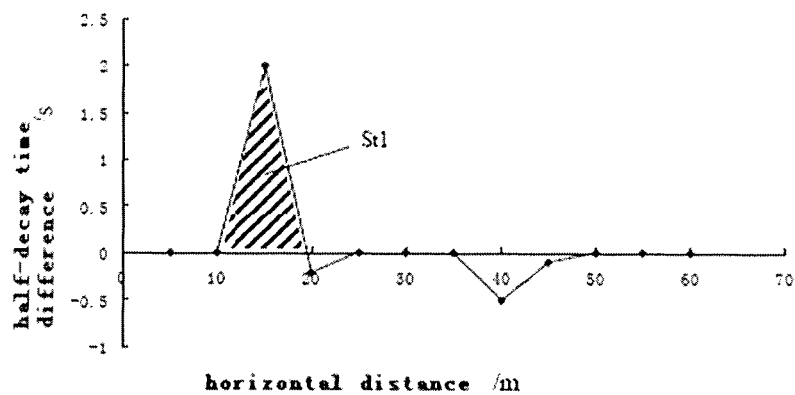
FIG. 11(a) is a relationship coordinate broken line view of the half-decay time difference data and the horizontal detection distance in the present invention (in a water body 1 with a known water quantity).
Figure 11:
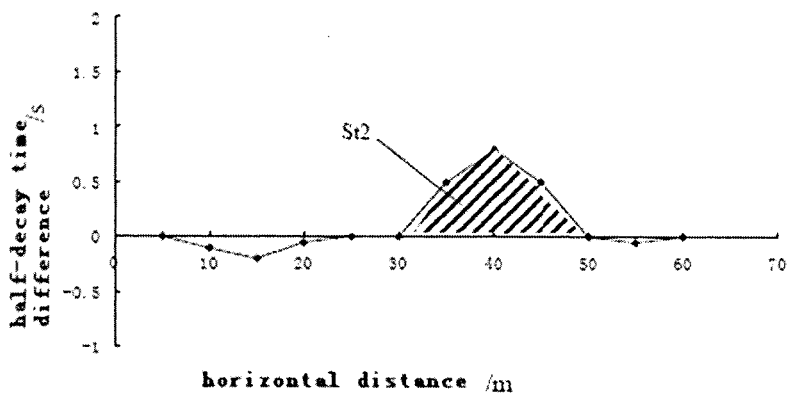
FIG. 11(b) is a relationship coordinate broken line view of the half-decay time difference data and the horizontal detection distance in the present invention (in a water body 2 with a known water quantity).
FIG. 11(c) is a relationship curve of the water quantities obtained by detecting the water bodies with the known water quantities two times and the envelope area in the present invention.
Figure 11:
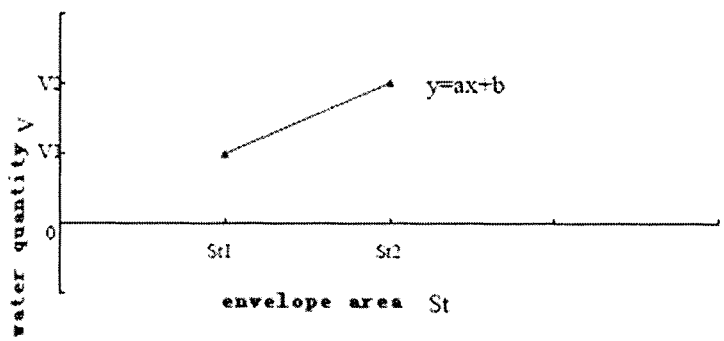

During a specific application in a project, the steps are as follows:

finding more than two water bodies with known water quantities, performing experimental detection, as shown in FIG. 11 (a) and FIG. 11 (b), obtaining the detection results, measuring the water quantities of water-bearing structures after actual excavation, establishing the preliminary mathematical linear relationship expression y=ax+b of the water quantities V and induced polarization information St (the envelope area of the half-decay time difference and the horizontal axis), as shown in FIG. 11 (c), and storing the actually-measured water quantities and the half-decay time difference data in the water quantity-induced polarization parameter database.

Figure 12:
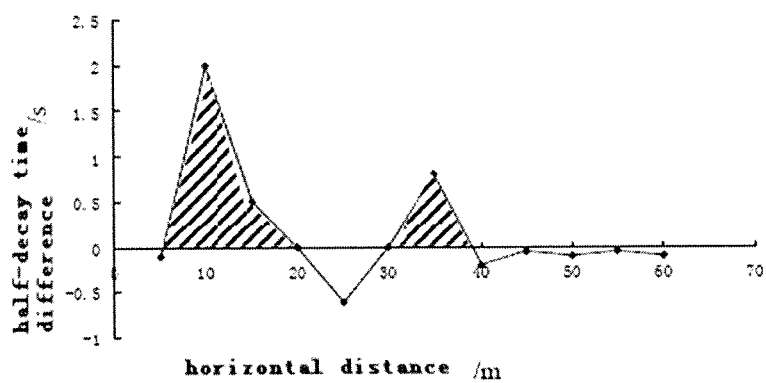
FIG. 12 is a relationship curve of the half-decay time difference data tested by actual advanced geologic forecast and the horizontal distance in the present invention.

During actual advanced geologic forecast work, performing water quantity estimation by virtue of the mathematical expression y=ax+b obtained in the water quantity-induced polarization parameter database and the actually-measured half-decay time difference data (as shown in FIG. 12).

Figure 13:
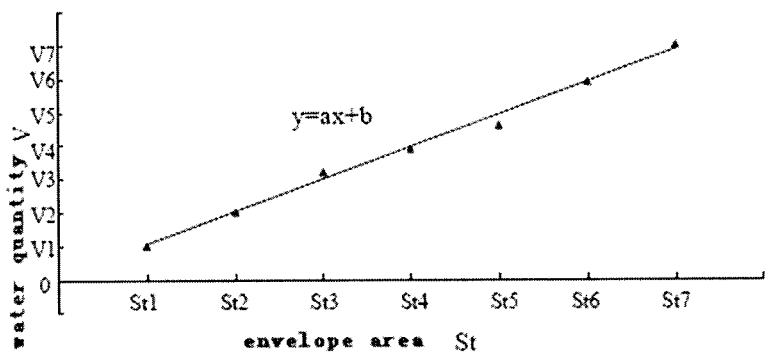
FIG. 13 is a relationship curve of the water quantities obtained by the amendment of a water quantity-induced polarization parameter database and the envelope area.

Measuring the water quantities of water-bearing bodies after actual excavation, amending the estimation data (as shown in FIG. 13), storing the actually-measured water quantities and the half-decay time difference data in the water quantity-induced polarization parameter database, then amending the mathematical relationship expression according to the data in the database, so as to perform the subsequent water quantity forecast work.

Meanwhile, the experimental data also indicate that the half-decay time difference parameter has a high capacity of distinguishing free water from bound water, when the half-decay time difference is a positive value, the water quantity of free water is reflected; and when the half-decay time difference is a negative value, the existence of bound water is reflected.

During the whole data acquisition process, induction of the power supply current and the shielding current is realized by the forward three-dimensional induced polarization transmitter 7 in the master control room 6, acquisition and calculation of the potential difference and half-decay time are realized by the forward three-dimensional induced polarization receiver 8 in the master control room 6, and the three-dimensional resistivity images of the geologic bodies ahead of the working face obtained by inversion and the relationship coordinate graph of the half-decay time difference data and the horizontal distance are displayed on the multi-screen display on an operation platform.

The content which is not detailed in the present invention belongs to the prior art and is not repeated redundantly.

The invention claimed is:

1. An advanced detector system using a forward three-dimensional induced polarization method for a TBM construction tunnel, wherein a master control room is arranged in a TBM main body, and a controller, a forward three-dimensional induced polarization transmitter and a forward three-dimensional induced polarization receiver are arranged in the master control room; at least one power supply and measurement electrode compartment is arranged on the cutter head of the TBM main body, on which multilayer rock coupling integrated electrodes, a support device for the power supply and measurement electrode compartment, and compartment doors are installed, and the multilayer rock coupling integrated electrodes form corresponding side lines on a working face; a power supply electrode and a reception electrode are arranged on a bottom plate behind the working face of the TBM main body, the rock coupling integrated electrodes are connected with the controller, the forward three-dimensional induced polarization transmitter and the forward three-dimensional induced polarization receiver by conductive wires respectively, and the power supply electrode and the reception electrode are connected with the forward three-dimensional induced polarization transmitter and the forward three-dimensional induced polarization receiver respectively; shielding electrode compartments and delivery devices for the shielding electrode compartments are further arranged at the front end and the periphery of the TBM main body, and shielding electrodes are installed in the shielding electrode compartments; and a video monitoring device is further arranged in the power supply and measurement electrode compartment, and connected with the master control room.

2. The advanced detector system using a forward three-dimensional induced polarization method for a TBM construction tunnel of claim 1, wherein a left power supply and measurement electrode compartment and a right power supply and measurement electrode compartment which are symmetrically distributed along the center of the TBM main body are provided, the compartment door of each power supply and measurement electrode compartment is divided into an upper part and a lower part, one part is provided with a convex groove, and the other part is provided with a concave groove; and opening and closing of the compartment door is controlled by the controller.

3. The advanced detector system using a forward three-dimensional induced polarization method for a TBM construction tunnel of claim 1, wherein the support device comprises three parallel measuring line guide rods, the measuring line guide rods are connected with each other by a vertical hydraulic lifting device, horizontal hydraulic expansion devices are further arranged at both ends of each measuring line guide rod, and the measuring line guide rod at the middle position is connected with horizontal hydraulic delivery devices; the rock coupling integrated electrodes are installed on each measuring line guide rod, and the horizontal hydraulic expansion devices at both ends; and the distance between the adjacent measuring line guide rods is 1.5-2.0 m.

4. The advanced detector system using a forward three-dimensional induced polarization method for a TBM construction tunnel of claim 1, wherein each rock coupling integrated electrode comprises two parts, namely, a rock coupling power supply electrode and a rock coupling reception electrode which are integrated together, wherein the rock coupling power supply electrode A comprises a metal electrode, the metal electrode is arranged in a PVC housing, the top end of the metal electrode is a rock coupling material, and the bottom end of the metal electrode is connected with a conductive wire; and the rock coupling reception electrode comprises a non-polarizing electrode, the non-polarizing electrode is arranged in another PVC housing, the top end of the non-polarizing electrode is an electrode cap, and the bottom end of the non-polarizing electrode is connected with a conductive wire.

5. The advanced detector system using a forward three-dimensional induced polarization method for a TBM construction tunnel of claim 1, wherein the video monitoring device is composed of a front-facing camera and a multi-window display, the front-facing camera is installed in the power supply and measurement electrode compartment, provided with an illumination lamp, and used for transmitting pictures to the display, the display is installed in the master control room of the TBM, and the front-facing camera is controlled by the controller.

6. The advanced detector system using a forward three-dimensional induced polarization method for a TBM construction tunnel of claim 1, wherein each shielding electrode compartment and the delivery device for the same comprise a shielding electrode compartment, shielding electrodes and a hydraulic delivery device, the shielding electrodes are divided into a working face shielding electrode group and a shield shielding electrode group according to installation positions, the working face shielding electrode group is distributed on the circumference of the contour line of the cutter head of the TBM main body, a circle of the shield shielding electrode group is arranged at a position 2-3 m behind the front end of the TBM main body; each shielding electrode comprises a metal electrode, the metal electrode is arranged in a PVC housing, the top end of the metal electrode is a rock coupling material, and the bottom end of the metal electrode is connected with a conductive wire, the shielding electrode is installed at the front end of the hydraulic delivery device, the hydraulic delivery device is installed in the shielding electrode compartment, the shielding electrode compartment is provided with a compartment door, and opening and closing of the compartment door is controlled by the controller.

7. The advanced detector system using a forward three-dimensional induced polarization method for a TBM construction tunnel of claim 1, wherein the power supply electrode and the reception electrode on the bottom plate behind the working face of the TBM main body are 100-150 m away from the working face of the TBM.

8. An advanced detection method utilizing the advanced detector system using a forward three-dimensional induced polarization method for a TBM construction tunnel of claim 1, comprising: arranging a circle of shielding electrodes on the contour line of the working face by utilizing the advanced detector system using the forward three-dimensional induced polarization method for the TBM construction tunnel, arranging a ring of shielding electrodes on the bottom plate of a side wall 2-3 m behind the tunneling working face, and arranging parallel measuring lines formed by a plurality of rock coupling integrated electrodes on the working face; and arranging a power supply electrode and a reception electrode on the bottom plate 100-150 m behind the working face;

supplying currents in the same direction to the power supply electrode and the shielding electrode, testing the potential difference between the multilayer rock coupling integrated electrodes and the reception electrode on the bottom plate and half-decay time respectively, and changing the current to test the potential difference between the multilayer rock coupling integrated electrodes and the reception electrode on the bottom plate and half-decay time under the different currents; performing inversion by virtue of the tested potential difference data, so as to obtain the three-dimensional resistivity images of geologic bodies ahead of the working face and realize three-dimensional location of water-bearing bodies; drawing the relationship coordinate graph of the half-decay time difference data and a horizontal distance by the tested half-decay time, calculating the envelope area of the half-decay time difference and a horizontal coordinate axis, drawing the two-dimensional cross-sectional graph of the envelope area, and realizing estimation of water quantities ahead of the working face.

9. The advanced detection method utilizing the advanced detector system using a forward three-dimensional induced polarization method for a TBM construction tunnel of claim 8, wherein a positive current $I_0$ is supplied to each rock coupling power supply electrode on the working face, a negative current $-I_0$ is supplied to the power supply electrode on the bottom plate, a positive current in the same direction with the rock coupling power supply electrodes on the working face is supplied to all the shielding electrodes on the contour line of the working face and the surrounding rock behind the working face, and the potential difference between the rock coupling reception electrode on the working face and the reception electrode on the bottom plate and the half-decay time are acquired;

after the data are acquired by each measuring line according to the aforementioned power supply and measurement method, a positive current $2I_0$ is supplied to each single rock coupling power supply electrode on the working face, a negative current $-I_0$ is supplied to the power supply electrode on the bottom plate, and the step of data acquisition is repeated.

10. The advanced detection method utilizing the advanced detector system using a forward three-dimensional induced polarization method for a TBM construction tunnel of claim 8, wherein after the data acquisition is finished, three-dimensional inversion imaging location is performed on water-bearing structures, inequality constraint inversion iteration based on a barrier function method and the like are used for processing, inversion is performed on the potential difference data tested in the aforementioned step, so as to obtain the three-dimensional resistivity images of geologic bodies ahead of the working face and realize three-dimensional location of water-bearing bodies; estimation of water quantities ahead of the working face is performed by virtue of the half-decay time data, the difference between the half-decay time data tested in the aforementioned step and the two half-decay time data at the same point position during two times of power supply with a high current and a low current is evaluated, a relationship coordinate graph of the half-decay time difference data and the horizontal distance is drawn respectively, the envelope area of the half-decay time difference and the horizontal coordinate axis is calculated, each water quantity is estimated by the area of a positive value part according to that the envelope area and the water quantity form a linear positive correlation relationship, and the positive value part is the response to the water quantity, and then estimation of the water quantity of a geologic disaster source is realized; free water and bound water are distinguished by virtue of the characteristics of the half-decay time difference, when the half-decay time difference is a positive value, the water quantity of free water is reflected, and when the half-decay time difference is a negative value, the existence of bound water is reflected.

11. The advanced detector system using a forward three-dimensional induced polarization method for a TBM construction tunnel of claim 3, wherein each rock coupling integrated electrode comprises two parts, namely, a rock coupling power supply electrode and a rock coupling reception electrode which are integrated together, wherein the rock coupling power supply electrode comprises a metal electrode, the metal electrode is arranged in a PVC housing, the top end of the metal electrode is a rock coupling material, and the bottom end of the metal electrode is connected with a conductive wire; and the rock coupling reception electrode comprises a non-polarizing electrode, the non-polarizing electrode is arranged in another PVC housing, the top end of the non-polarizing electrode is an electrode cap, and the bottom end of the non-polarizing electrode is connected with a conductive wire.

* * * * *

UNITED STATES PATENT AND TRADEMARK OFFICE
CERTIFICATE OF CORRECTION

PATENT NO. : 9,091,779 B2  
APPLICATION NO. : 14/235307  
DATED : July 28, 2015  
INVENTOR(S) : Li et al.

Page 1 of 1

It is certified that error appears in the above-identified patent and that said Letters Patent is hereby corrected as shown below:

On the title page

Delete Item "(71) Applicant: SHANDONG UNIVERSITY, JiNan, ShangDong Province (CN)"

Insert -- (71) Applicant: SHANDONG UNIVERSITY, JiNan City, ShanDong Province (CN) --

Delete Item "(72) Inventor: Schucai Li, JiNan (CN); Bin Liu, JiNan (CN); Zhengyu Liu, JiNan (CN); Lichao Nie, JiNan (CN); Jie Song, JiNan (CN); Huaifeng Sun, JiNan (CN); Chunjin Lin, JiNan (CN); Chuanwu Wang, JiNan (CN); Xinji Xu, JiNan (CN); Lei Xu, JiNan (CN); Tingyu Hao, JiNan (CN); Hao Zhou, JiNan (CN)"

Insert -- (72) Inventor: Schucai Li, JiNan City (CN); Bin Liu, JiNan City (CN); Zhengyu Liu, JiNan City (CN); Lichao Nie, JiNan City (CN); Jie Song, JiNan City (CN); Huaifeng Sun, JiNan City (CN); Chunjin Lin, JiNan City (CN); Chuanwu Wang, JiNan City (CN); Xinji Xu, JiNan City (CN); Lei Xu, JiNan City (CN); Tingyu Hao, JiNan City (CN); Hao Zhou, JiNan City (CN) --

Delete Item "(73) Assignee: SHANDONG UNIVERSITY, Jinan (CN)"

Insert -- SHANDONG UNIVERSITY, JiNan City (CN) --

Delete Item "(30) Foreign Application Priority Data
  Jan. 7, 2013 (CN) 2013 1 0051329
  Jan. 7, 2013 (CN) 2013 2 0067322 U"

Insert -- (30) Foreign Application Priority Data
  Jan. 7, 2013 (CN) 2013 1 00051329
  Jan. 7, 2013 (CN) 2013 2 00067322 U --

Signed and Sealed this  
Ninth Day of February, 2016

Michelle K. Lee  
*Director of the United States Patent and Trademark Office*